United States Patent
Feraud et al.

(10) Patent No.: US 10,587,420 B2
(45) Date of Patent: Mar. 10, 2020

(54) METHOD IMPLEMENTED IN AN IDENTITY DOCUMENT AND ASSOCIATED IDENTITY DOCUMENT

(71) Applicant: OBERTHUR TECHNOLOGIES, Colombes (FR)

(72) Inventors: Alban Feraud, Colombes (FR); Arnaud Sourdrille, Colombes (FR)

(73) Assignee: IDEMIA FRANCE, Colombes (FR)

( * ) Notice: Subject to any disclaimer, the term of this patent is extended or adjusted under 35 U.S.C. 154(b) by 91 days.

(21) Appl. No.: 15/532,872

(22) PCT Filed: Nov. 27, 2015

(86) PCT No.: PCT/FR2015/053251
§ 371 (c)(1),
(2) Date: Jul. 21, 2017

(87) PCT Pub. No.: WO2016/087754
PCT Pub. Date: Jun. 9, 2016

(65) Prior Publication Data
US 2018/0270071 A1    Sep. 20, 2018

(30) Foreign Application Priority Data

Dec. 3, 2014 (FR) ...................... 14 61885

(51) Int. Cl.
*G06F 7/04* (2006.01)
*H04L 9/32* (2006.01)
(Continued)

(52) U.S. Cl.
CPC .......... *H04L 9/3263* (2013.01); *B42D 25/305* (2014.10); *G06F 21/33* (2013.01);
(Continued)

(58) Field of Classification Search
None
See application file for complete search history.

(56) References Cited

U.S. PATENT DOCUMENTS 6,508,400 B1 * 1/2003 Ishifuji ............... G06Q 20/341
                                                  235/380
7,724,924 B2 * 5/2010 Didier ................ G06K 9/00885
                                                  340/5.82
(Continued)

FOREIGN PATENT DOCUMENTS

DE   10 2006 061 338 A1   6/2008
EP         1 028 396 A2   8/2000
(Continued)

OTHER PUBLICATIONS

Arjowiggins Security SAS—Gep S.p.A., "Security Target SOMA-c004 Electronic Passport EAC-SAC-AA Public Version Common Criteria version 3.1 revision 4 Assurance Level EAL 5+", Nov. 17, 2014, XP055215561, https://www.commoncriteriaportal.org/files/epfiles/ST-lite279.pdf.
(Continued)

*Primary Examiner* — Brandon S Hoffman
(74) *Attorney, Agent, or Firm* — Young & Thompson

(57) ABSTRACT

Disclosed is a method implemented in an identity document including a microcircuit and a unit enabling the microcircuit to communicate with a terminal, the microcircuit being designed to permit the transmission of data obtained (directly or indirectly) from data memorized in a storage zone in response to a request received from the terminal, furthermore including the following steps: reception by the microcircuit of an identifier of the terminal; at least partial comparison of the identifier of the terminal and of at least one portion of an identifier stored in the microcircuit; and performance of a set action depending on the result of the
(Continued)

comparison. An identity document in which such a method is implemented is also described.

19 Claims, 3 Drawing Sheets

(51) Int. Cl.
*G06F 21/77* (2013.01)
*G07C 9/00* (2020.01)
*H04L 29/06* (2006.01)
*G06F 21/62* (2013.01)
*G06F 21/33* (2013.01)
*G06F 21/44* (2013.01)
*B42D 25/305* (2014.01)
*H04W 12/02* (2009.01)

(52) U.S. Cl.
CPC .......... *G06F 21/445* (2013.01); *G06F 21/629* (2013.01); *G06F 21/6218* (2013.01); *G06F 21/6281* (2013.01); *G06F 21/77* (2013.01); *G07C 9/00119* (2013.01); *H04L 9/3268* (2013.01); *H04L 9/3271* (2013.01); *H04L 63/0492* (2013.01); *H04L 63/0823* (2013.01); *H04L 63/0861* (2013.01); *H04L 63/0869* (2013.01); *H04L 63/0876* (2013.01); *H04L 63/101* (2013.01); *H04W 12/02* (2013.01); *H04L 2209/805* (2013.01)

(56) References Cited

U.S. PATENT DOCUMENTS

| | | | | |
|---|---|---|---|---|
| 8,284,024 B2 * | 10/2012 | Toleti | ...................... | G06F 21/32 340/5.8 |
| 8,410,902 B2 * | 4/2013 | Kevenaar | ......... | G06Q 20/40145 340/5.1 |
| 8,677,139 B1 * | 3/2014 | Kalocsai | ............... | H04L 9/3231 382/115 |
| 8,806,582 B2 * | 8/2014 | Dietrich | .................. | G06F 21/33 726/4 |
| 2004/0069845 A1 * | 4/2004 | Goldstein | .............. | G06K 19/04 235/380 |
| 2005/0212657 A1 * | 9/2005 | Simon | ..................... | G06F 21/32 340/5.74 |
| 2010/0176918 A1 * | 7/2010 | Turner | ................. | G07C 9/00111 340/5.61 |
| 2013/0015952 A1 * | 1/2013 | Menczel | ............ | G06K 9/00885 340/5.82 |
| 2014/0013108 A1 * | 1/2014 | Pellikka | .............. | H04L 63/0807 713/156 |

FOREIGN PATENT DOCUMENTS

| EP | 2 280 380 A1 | 2/2011 |
|---|---|---|
| EP | 2 447 835 A1 | 5/2012 |
| GB | 2 427 055 A | 12/2006 |

OTHER PUBLICATIONS

Smart Card Alliance, "ePassport Frequently Asked Questions", Mar. 2009.
International Search Report, dated Feb. 11, 2016, from corresponding PCT application.

* cited by examiner

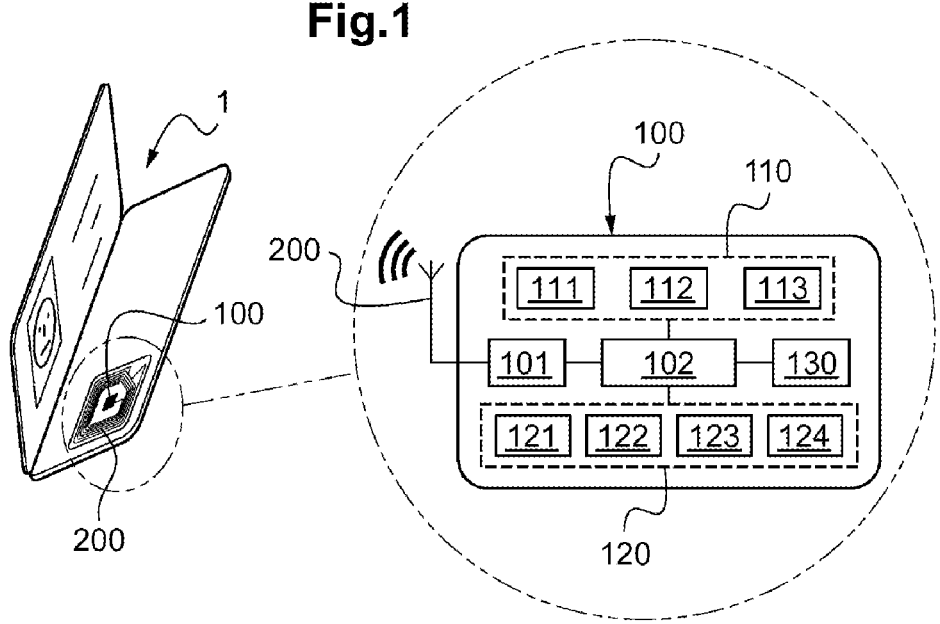

METHOD IMPLEMENTED IN AN IDENTITY DOCUMENT AND ASSOCIATED IDENTITY DOCUMENT

TECHNICAL FIELD TO WHICH THE INVENTION RELATES

The present invention generally relates to the field of digital identity.

It relates more particularly to a method implemented in an identity document and an associated identity document.

TECHNOLOGICAL BACKGROUND

The use is known of identity documents comprising a microcircuit and means enabling the microcircuit to communicate with a terminal, such as a system for inspecting identity documents.

The microcircuit is designed to transmit identity data memorized in the microcircuit in response to a request received from said inspection system.

Thus, when an individual presents such an identity document, the identity data are received by the terminal. These identity data can then be displayed so that an official assigned to the terminal verifies the correspondence between the displayed image (showing for example the face of the individual) and the individual present, or they can be used in order to be compared with biometric data obtained from the individual present (for example by taking a fingerprint).

The exchanges possibly implemented between such an identity document and an inspection system are described for example in the documents "*BSI TR*-03110 *Technical Guideline Advanced Security Mechanisms for Machine Readable Travel Documents*" produced by the German Federal Office for Information Security BSI ("*Bundesamt für Sicherheit in der Informationstechnik*").

OBJECT OF THE INVENTION

In this context, the present invention proposes a method implemented in an identity document comprising a microcircuit and means enabling the microcircuit to communicate with a terminal, the microcircuit being designed to permit the transmission of data (and, for example, to transmit these data) obtained (directly or indirectly) from data memorized in a storage zone in response to a request received from said terminal, furthermore comprising the following steps:
reception by the microcircuit of an identifier of said terminal,
at least partial comparison of said identifier of the terminal and of at least one portion of an identifier memorized in the microcircuit, and
performance of an action determined on the basis of the result of said comparison.

"Identity document" here means an object providing information about its holder. Such an object can be an electronic travel document, an identity card, a user card, a professional card or even an electronic device such as a mobile telephone or a touchscreen tablet.

The data memorized in the storage zone comprise data relating to the holder of the document: name, first name, photograph, of his/her face in particular, biometric data, together with, for example, application data or applications enabling the creation of electronic signatures. The storage zone can be located directly in the microcircuit, within a memory module, or it can be distributed within an information network with which the microcircuit communicates (in particular, within a dematerialized storage system or "cloud").

The data whose transmission is enabled within this method are obtained directly or indirectly from data memorized in the storage zone. In other words, the data whose transmission is enabled can correspond to:
data contained in the storage zone, or
data obtained by transforming data contained in the storage zone (several examples of such transformations are described when describing the figures), or
data produced from data contained in the storage zone, for example an electronic signature, produced from cryptographic data contained in the storage zone.

The fact that the microcircuit determines and performs an action itself depending on the identifier associated with a terminal allows great flexibility in the configuration of such an electronic identity document and in the addition or removal, and the activation or deactivation, of additional functionalities. In fact, this makes it possible to benefit from these additional functionalities, while keeping such an identity document very widely compatible with existing networks of terminals, and with the information management systems that manage such sets of terminals, since the implementation of these additional functionalities does not necessitate changes to such a network of terminals, or to the corresponding information system, which is extremely advantageous.

Other non-limitative and advantageous characteristics of a method according to the invention are as follows:
it further comprises a step of authentication of said terminal by the microcircuit,
at least one portion of said transmitted data are transmitted subsequently to the step of performing said action,
at least one portion of said transmitted data are transmitted whatever the result of the comparison step,
said action comprises a change of said data memorized in the storage zone,
said change comprises the removal or addition of marking data initially combined with biometric data of an individual,
said removal is only implemented if the received identifier corresponds to an identifier memorized in said microcircuit and associated with a terminal therefore intended, during the production of said identity document, to issue the latter to its holder.

It is also provided that said change of identity data memorized in the storage zone targets an activation variable, when a received identifier corresponds to an identifier memorized in said microcircuit and associated with a terminal therefore intended, during the production of said identity document, to issue the latter to its holder, and that the microcircuit is designed to remove or add marking data to said data obtained on the basis of said activation variable, before the transmission of data obtained from data memorized in a storage zone.

The invention also proposes that:
said action comprises incrementing a counter value of said microcircuit recording the number of performances by the latter of a given set action,
said action is furthermore determined on the basis of the counter value,
said biometric data in which marking data are removed are data representative of an image, and said removal is performed by the microcircuit if the counter value indicates that said removal has not been performed by the microcircuit at any previous time, said action comprises a change of the level of quality of biometric data memorized in the storage zone, said action comprises incrementing a counter value, memorized in the microcircuit and indicative of the number of identifications by the microcircuit of a given terminal, said action comprises selecting said transmitted identity data from among a set of identity data contained in said microcircuit, depending on the result of said comparison, said authentication comprises verifying, by means of a public key memorized in said microcircuit, a signature of an electronic certificate received from the terminal, and that said electronic certificate comprises a data item enabling to identify a terminal or a family of terminals from among a plurality of terminals.

It is also provided that a field of said electronic certificate is a "Certificate Holder Reference (CHR)" as defined in the document "BSI TR-03110 Technical Guideline Advanced Security Mechanisms for Machine Readable Travel Documents" produced by the German Federal Office for Information Security BSI ("Bundesamt für Sicherheit in der Informationstechnik"), or a truncation thereof, said "Certificate Holder Reference (CHR)" comprising the following concatenated items:

a country code of 2 bytes conforming to standard ISO 3166-1 ALPHA-2, and a mnemonic code, varying in size up to 9 characters conforming to standard ISO/IEC 8859-1, and a sequence of 5 digital or alphanumerical characters conforming to standard ISO/IEC 8859-1.

According to another possibility, said item of identification data is a public key for authenticating the terminal, or a representation resulting from a deterministic transformation of said public key.

It is also possible to envisage that said authentication comprises a step of verifying, by means of a public key of the terminal received from the terminal, a response to a challenge transmitted by the microcircuit, said response being signed by means of a private key of the terminal.

The advantageous effects generated by these additional characteristics are described in detail below when describing the attached figures.

An identity document comprising a microcircuit including a memory module, and means enabling the microcircuit to communicate with a terminal, is also provided, the microcircuit being designed to permit the transmission of data obtained from data memorized in a storage zone in response to a request received from said terminal, said memory module furthermore memorizing at least one identifier and said microcircuit furthermore being designed to:

receive an identifier of said terminal, at least partially compare the received identifier of said terminal and at least one portion of the identifier memorized in said memory module, and perform an action determined on the basis of the result of said comparison.

The additional characteristics described above in terms of method can also be applied to such an identity document.

BRIEF DESCRIPTION OF THE DRAWINGS

The description that will follow with reference to the attached drawings, given as non-limitative examples, will enable good understanding of what the invention consists of and how it can be embodied.

On the attached drawings:

FIG. 1 diagrammatically shows an identity document comprising an antenna and a microcircuit in which a method according to the invention can be implemented, and the main units of such a microcircuit, FIG. 2 diagrammatically shows the structure of data for identifying inspection systems, said data being contained in said microcircuit, FIG. 3 diagrammatically shows a portion of the steps implemented during the manufacture, commissioning and use of such an identity document, FIG. 4 diagrammatically shows the main steps of a method according to the invention, FIG. 5 diagrammatically shows an example of transformation of identity data, representative of an image of the face of the holder of an identity document, said transformation being able to be performed within a method according to the invention, FIG. 6 diagrammatically shows the main steps of a method according to the invention implemented when issuing an identity document to its holder and in which such a transformation is advantageously applied.

DETAILED DESCRIPTION OF THE PREFERRED EMBODIMENTS

Figure 3:
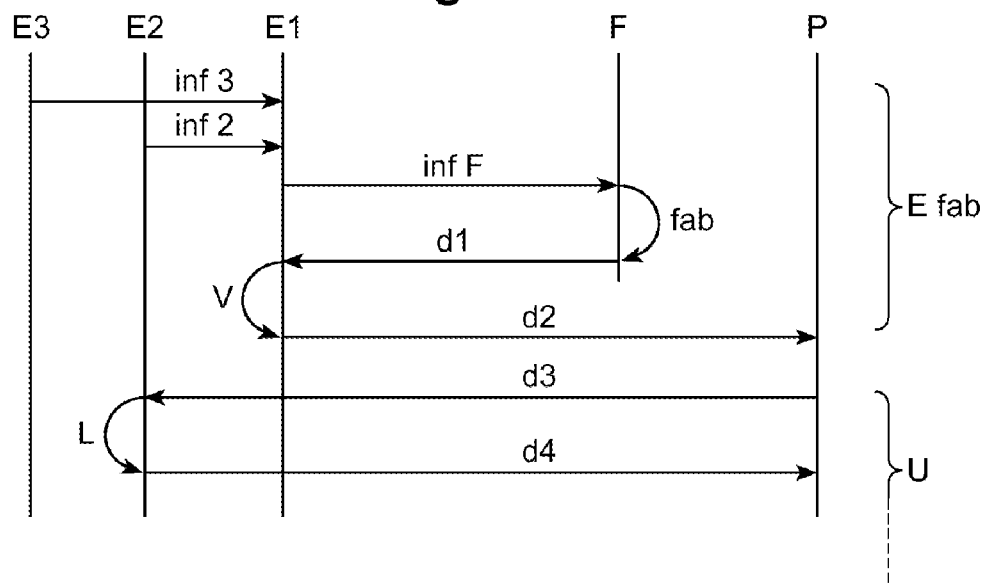

FIG. 1 diagrammatically shows an identity document 1 comprising an antenna 200 and a microcircuit 100, such as for example an electronic travel document, an identity card, a user card or a professional card, in which a method according to the invention can be implemented.

The antenna 200 is connected to a communication module 101 of the microcircuit. The communication module 101 adapts the electrical signals received from the antenna 200 so that said module can then be used by a control module 102, such as a microprocessor.

The antenna 200 therefore enables the microcircuit 100 to enter into communication with a terminal (for example, a system for inspecting identity documents), and in particular, to receive, without contact, data from the latter. In the continuation of this document, "terminal" designates:

a communication terminal interfacing the identity document 1 with an application (for example, an electronic signature application), or a system for inspecting electronic travel documents (or "Machine Readable Travel Documents"), such as a customs terminal for reading and inspecting travel documents, or an application interacting with the information system contained in the microcircuit 100.

The antenna 200, associated with the communication module 101, can also transmit data delivered by the microcircuit 100 and intended for such a terminal. The protocol used during these exchanges can for example conform to the standard ISO/IEC 18092, or to the standard ISO/IEC 14443, or to any other standard compatible with the identity document 1 and with the terminal.

The microcircuit 100 also includes a memory module divided into distinct memory zones, in particular:

a memory zone where data 110 for internal use, used by the microcircuit for its functioning, are saved, a memory zone where communication data 120 (user data) are saved, and a memory zone where data 130 for monitoring the use of the identity document 1 are saved, said data being able both to be used by the microcircuit for its functioning and to be communicated to the exterior by the latter.

In this embodiment, the storage zone, comprising the data from which the data transmitted by the microcircuit (100) are obtained, is therefore contained in the microcircuit (100) itself. In other embodiments, this storage zone can be distributed within an information network with which the microcircuit communicates, as mentioned above.

The data 110 for internal use can comprise:

- data 111 for identifying terminals, described in greater detail when describing FIG. 2, containing in particular identifiers of inspection systems susceptible to exchange information with the microcircuit 100,
- application data 112, for example an operating system, computer programs, including a program comprising instructions which, when executed by the control module 102, make it possible to implement a method according to the invention, and, optionally, additional cryptographic data used by the control module 102 to cipher/decipher, sign/verify the signature of information exchanged by the microcircuit through the antenna 200 or to remove marking data from it, and
- private data 113 comprising for example high definition biometric data of the holder of the electronic travel document, and a copy of data 124 for national use, such as described below.

The communication data 120 can comprise in particular:

- data 121 for authenticating the identity document 1 or the identification data of the holder that it contains, such as an electronic certificate, containing for example an electronic signature produced by the issuing entity of said identity document 1 by means of a private (cryptographic) key, said issuing entity being able to make available to entities of its choice a public (cryptographic) key enabling to verify the authenticity of the identity document 1 by verifying said signature;
- public identity data 122 comprising for example the name of the holder of the identity document 1, his/her date of birth, his/her nationality, a serial number of the identity document and its expiry date; a copy of these data can also be present in the private data 113;
- restricted access identity data 123 comprising for example biometric data of the holder of the electronic travel document, such as data representative of an image of his/her face, one of his/her hands, one of his/her irises, or his/her venous network; these biometric data can also comprise one or more of the holder's fingerprints; and
- data 124 for national use whose use is reserved for entities of the state issuing the identity document 1 or for outside entities authorized by the latter.

The data 130 for monitoring the use of the identity document can comprise a counter value indicating the number of times the identity document 1 has been presented a given terminal. In the case where the identity document is an electronic travel document, the data 130 can also comprise, for example, the list of border checkpoints at which the latter has been presented.

In a method according to the invention, embodiment examples of which are described in detail below, in particular when describing FIGS. 4 and 6, the microcircuit 100 can transmit a portion of the communication data 120 to a terminal depending on the access rights this terminal possesses. The selection, from among the data contained in the microcircuit, of the data made accessible to a given terminal, can be made:

- either explicitly, depending on data dai describing these access rights, and contained in the data 111 for identifying inspection systems, as explained below,
- or implicitly, as a consequence of the present configuration of the microcircuit 100, or as a consequence of an operation performed by the latter further to the identification of said terminal.

The way in which these access rights can be prioritized is illustrated below by an example, in which the identity document 1 is an electronic travel document. In this example:

- the public identity data 122 can be transmitted by the microcircuit to any terminal with which it communicates, as well as the authentication data 121 of the electronic travel document;
- the restricted access identity data 123, in particular biometric data of the holder of the electronic travel document, can for example be transmitted by the microcircuit to inspection systems identified thanks to the identification data 111 as belonging to states authorized by the state issuing the electronic travel document to access such biometric data;
- the data 124 for national use, such as for example the social security number of the holder of the electronic travel document, can be transmitted by the microcircuit to inspection systems identified thanks to the identification data 111 as belonging to the state issuing the electronic travel document; and
- the data 130 for monitoring the use of the electronic travel document, containing for example the list of border checkpoints at which the electronic travel document has been presented, and possibly the corresponding dates, can be transmitted by the microcircuit to inspection systems identified, thanks to the identification data 111, as belonging to the customs service of the state issuing the electronic travel document, or as belonging to the entity of this state tasked with issuing the electronic travel document.

The memory zones where the data 110 for internal use, the communication data 120, and the data 130 for monitoring the use of the identity document are saved can be distributed in one or more non-volatile, rewritable memories of the EEPROM or Flash NAND type for example.

FIG. 2 diagrammatically shows the structure of the data 111 for identifying inspection systems. These data are organized in the form of a correspondence table T, which contains a list of identifiers of inspection systems (id1, id2 . . . idi . . . ), these possibly being able to be truncated so as to designate a family of terminals. Actions (A1, A2 . . . Ai . . . ) are associated with these identifiers. For example, as FIG. 2 shows, the action A1 is associated with the identifier id1. Optionally, access rights (da1, da2 . . . dai . . . ) can also be associated with the identifiers (id1, id2 . . . idi . . . ) in the correspondence table T.

As described in greater detail below, the authentication and identification, by the microcircuit, of a terminal with which it communicates, are accompanied by the performance, by the microcircuit, of the action that the correspondence table T associates with it. The performance of this action can depend on specific additional conditions defined in the table T, corresponding to the action and/or the identifier concerned. Such a specific additional condition can for example be that said action has not been performed by the microcircuit at any previous time. Such a condition can for example be physically verified by testing a counter value (this value being part of the data 130 for monitoring the use of the identity document).

In the correspondence table T, several different identifiers can be grouped in the same set, and therefore associated with a common action. For example, the identifiers associated with the customs inspection systems of exit border crossing points from a state issuing an electronic travel document can be grouped in a set, with which a common action is associated, comprising for example the erasure of the data 124 reserved for national use.

Several physically different inspection systems can furthermore be associated with the same identifier of the correspondence table T.

An identifier can be present in the correspondence table T without an action being associated with it. Stated differently, a terminal can be identified in the correspondence table T as being authorized to communicate with the microcircuit (by virtue of the presence of its identifier in the table) without this meaning that an action is associated with it, or, stated differently again, such an action can consist for the microcircuit 100 of performing no operation.

Finally, the identifiers id1, id2 . . . idi contained in the correspondence table T can be associated with cryptographic data dc1, dc2 . . . dci, such as cryptographic keys, enabling for example to authenticate the source of data received from a terminal.

In a particular embodiment, the identifiers id1, id2 . . . idi are tailored to be compared with an identifier of a terminal transmitted by the latter. Such an identifier is for example the field "Certificate Holder Reference", a public key CP2 particular to this terminal (or to this inspection system), or data obtained by a deterministic transformation of this key (that is to say a digital impression of this key CP2), transmitted within a certificate whose format conforms to the format recommended by the German Federal Office for Information Security BSI ("Bundesamt für Sicherheit in der Informationstechnik") in the context of the Extended Access Control (EAC) provisions for checking electronic travel documents. The format of such a certificate containing in particular the field "Certificate Holder Reference" is specified in the technical report "TR-03110-3 Advanced Security Mechanisms for Machine Readable Travel Documents, part 3: common specifications", version 2.10 of Mar. 20, 2012 (in particular in the appendices A.6.1 and C.2.4 of this report) produced by the German Federal Office for Information Security BSI ("Bundesamt für Sicherheit in der Informationstechnik").

In this particular embodiment, the cryptographic data dc1, dc2 . . . dci contain a public cryptographic key CP1 of a certifying authority, which makes it possible to verify an electronic signature of the data transmitted by a terminal for identification and authentication. This public cryptographic key CP1 is for example particular to the organization to which the terminal belongs. The data transmitted by the terminal for identification and authentication comprise, in this embodiment, a certificate such as that described above, and a public key CP2 contained in this certificate. This public key CP2 is used by the microcircuit 100 in order finally to authenticate the terminal by a method of the "challenge-response" type.

FIG. 3 diagrammatically shows a portion of the steps implemented during the manufacture, commissioning and use of the identity document 1, with the aim of illustrating the interaction between the different entities intervening during these steps. On this figure, time flows from top to bottom. The entities involved in the performance of these steps comprise:

an individual for whom the identity document 1 is intended, and who is identified by the latter, here called the holder (P) of the identity document, an issuing entity E1, for example a state, under whose responsibility the identity document 1 is issued, an entity F tasked by the issuing entity E1 with all or part of the manufacture of the identity document 1, and two client entities E2 and E3 for which the identity document 1 can also be used.

Before the identity document 1 is manufactured, the client entities E2 and E3 transmit to the issuing entity E1 data intended to be memorized in the microcircuit 100 of the identity document 1 (exchanges of information inf2 and inf3), like for example public (cryptographic) keys such as the public key CP1 described above. These data enable the identity document 1 to be used within a network of entities (comprising for example the entities E1, E2 and E3), as explained below. The distribution of these data and their authentication can be performed under the control of a certifying authority or of a network of certifying authorities, which is desirable given the sensitive nature of these data, used for security purposes.

The issuing entity E1 can then transmit to the entity F the data necessary for manufacturing the identity document 1 (exchange of information infF), comprising for example identity data of the future holder P of the identity document 1, identifiers of systems, the data transmitted by the entities E2 and E3 mentioned in the previous paragraph, and generally, all of the data necessary for the creation of the correspondence table T. The identity document 1 is then manufactured (step fab) then returned to the issuing entity (transfer d1).

The issuing entity E1 can then proceed to a verification and/or to an activation V of the identity document 1, after which it is finally issued (transfer d2) to its holder P. An example of implementation of such an activation is described below when describing FIGS. 5 and 6. This issuing marks the end of the manufacturing steps Efab of the identity document 1.

In the phase of use U of this identity document 1, its holder P can use it in particular with entities, for example to identify him/herself (to the entity E2, in this example). In this case, the holder P of the identity document 1 transmits it to a terminal of the entity E2 (transfer d3), which then proceeds to the electronic reading L of said document 1.

During this reading, the terminal that communicates with the microcircuit 100 of the identity document 1 can first of all proceed to an authentication of the latter. This step of authenticating the identity document 1 is not the object of the present invention as such, and will therefore not be described in detail. It will simply be noted that it can be performed thanks in particular to the data 121 for authenticating the identity document 1, said data being contained in the microcircuit 100, and that it can be accompanied by the creation of a channel of secured (by ciphering and signature of the data) exchanges between the terminal and the microcircuit 100.

The terminal is then authenticated and identified by the microcircuit 100 of the identity document 1, which can then supply it with identity data of the holder P, as described in detail below when describing FIG. 4. After these steps L of reading the identity document 1, the latter is returned to its holder P (transfer d4).

Figure 4:
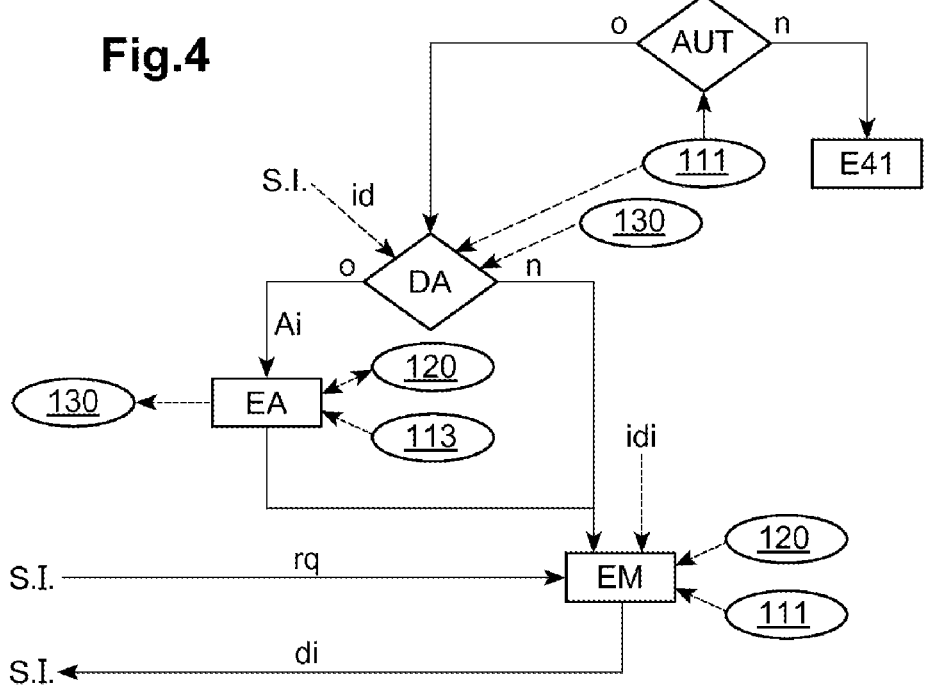

FIG. 4 diagrammatically shows the main steps of a method according to the invention, implemented in a microcircuit 100 of an identity document 1 such as that described above. This configuration or reconfiguration method, is implemented during the entire phase of use U of the identity document 1 when a terminal connects to the microcircuit 100 in order there to read the identity data of its holder P. All of the steps shown on FIG. 4 are performed by the microcircuit 100.

This method starts for example after the optional steps during which the terminal S.I. (for example an inspection system) can authenticate the identity document 1, as mentioned previously.

This method starts with a step AUT of authentication of the terminal S.I. by the microcircuit 100 with which it communicates, on the basis of authentication data dau received from the terminal S.I.

In a particular embodiment, these authentication data dau comprise a certificate containing an identifier of the "Certificate Holder Reference" type and a public key CP2 such as those described above when describing FIG. 2.

The authentication of the terminal S.I. can then advantageously be performed in accordance with the recommended Extended Access Control (EAC) provisions for checking electronic travel documents described in the technical reports "TR-03110" version 2.10 of Mar. 20, 2012 produced by the German Federal Office for Information Security BSI ("Bundesamt für Sicherheit in der Informationstechnik").

This assists with making an identity document including a microcircuit, in which such a method is implemented, compatible with the network of systems for inspecting electronic travel documents very widely installed in the European Union in particular, in the context of the abovementioned "Extended Access Control" provisions.

For example, the microcircuit 100 first of all verifies, by means of the public key CP1 (memorized in the microcircuit as already indicated), the signature contained in the certificate received from the terminal.

If this verification proceeds with success, the microcircuit 100 generates a challenge (for example, a random number) and transmits this challenge to the terminal so that it produces a signature using in particular this challenge and its own private authentication key. The terminal then sends in response the signature produced to the microcircuit 100 so that it can verify this signature by means of the public key CP2 of the terminal (which key is received for example from the terminal within the abovementioned certificate), which makes it possible to authenticate the terminal.

At the end of the step AUT, if the terminal S.I. has not been authenticated by the microcircuit, the method ends with a terminal step E41, during which no action is performed by the microcircuit 100, and no additional right is granted to the terminal. The functioning of the microcircuit is then suspended until it is once again connected to a terminal.

However, if the terminal S.I. has been correctly authenticated during the step AUT, the method continues with a step DA during which the microcircuit identifies the terminal S.I. and determines an action Ai to perform on the basis of the correspondence table T.

The identification of the terminal S.I. is performed by comparing an identifier id transmitted by the terminal with the identifiers id1, id2 . . . idi contained in the correspondence table T memorized in the microcircuit 100. As explained when describing this correspondence table, the identifier id (for example the "Certificate Holder Reference" field, the public key CP2 of the terminal, or a digital impression of the public key CP2 obtained by a deterministic transformation of the latter) can have been transmitted to the microcircuit 100 since the preceding step AUT, within an electronic certificate contained in the authentication data dau. The identifier id can also be transmitted independently of these data dau, during the step DA.

It is noted that the comparison step can be implemented by comparing the totality of the received identifier id with the identifiers contained in the correspondence table T, or, as a variant, by comparing only a portion of the received identifier id with an identifier portion memorized in the correspondence table T, which makes it possible to implement a given action (associated in the table with said identifier portion) for a family of inspection systems or terminals (whose identifiers have in common said identifier portion).

It is also understood that the memorized identifier can be a portion of the identifier of the terminal.

If the identifier id of the terminal S.I. is not present in the correspondence table T, the method continues directly with the step of transmitting identity data EM described below, during which the microcircuit 100 can respond to a request rq to read the identity data 120 received from the terminal S.I.

If, on the contrary, the identifier id of the terminal S.I. corresponds to an identifier idi present in the correspondence table T, the microcircuit 100 then determines that it must perform the action Ai. Before determining that it must perform the action Ai, the microcircuit 100 can nonetheless perform, optionally, a specific additional test, when this is present in the table T, corresponding to the action Ai, as explained previously.

Figure 5:
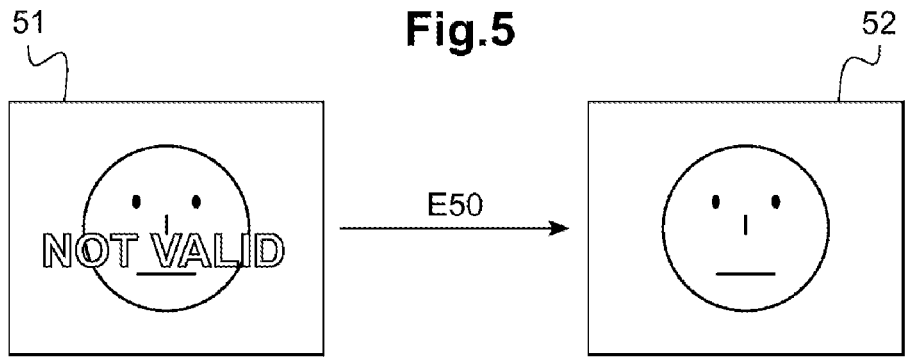
Figure 6:
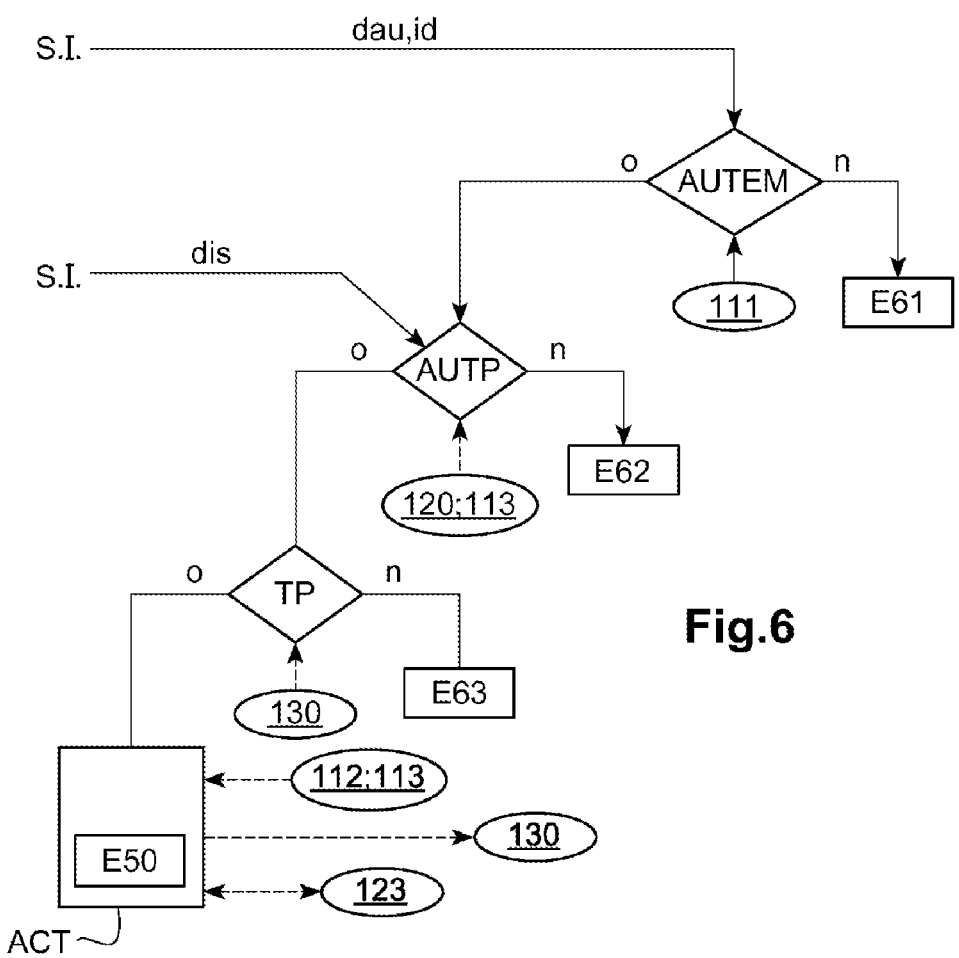

The action Ai determined in this way is then performed in the step EA. Several examples of such actions are described below, when describing the different applications of such a method. The performance of the action Ai may comprise:

reading a portion of the private data 113, the transformation (or change), erasure or writing of restricted access identity data 123 and/or data 124 for national use, writing or changing data 130 for monitoring the use of the identity document 1, activating a functionality, which can then be implemented by the microcircuit 100 during subsequent steps of use of the identity document 1 (this functionality can for example be a functionality of "marking" or "unmarking" biometric data by the microcircuit 100, as described below when describing FIGS. 5 and 6). The action Ai can also consist of performing no operation, as has already been mentioned.

Once the step EA has been performed, the method continues with the step EM of transmitting identity data. During this step EM, the microcircuit 100 responds to a request rq to read identity data 120, said request being received from the terminal S.I., communicating to the latter all or a portion of the identity data 120 of its holder (transfer of data di). During this transmission step EM, the data transmitted by the microcircuit 100 can be selected from among the identity data 120 depending on the access rights dai associated with the identifier idi in the correspondence table T.

For example, in the case where the identity document 1 is an electronic travel document issued by a state of the European Union, customs inspection systems of other states of the European Union cannot detect the presence of data 124 for national use, and are therefore unaware of their presence.

It is also possible to envisage that if the identifier id of the terminal S.I. is not part of the correspondence table T then only identity data 122 for public access are rendered accessible by the microcircuit 100.

Advantageous functionalities, added for example to the simple delivery of public identity data 122, can therefore be obtained through an appropriate choice of actions (A1, A2 . . . Ai . . . ) associated with the identifiers of inspection systems (id, id2 . . . idi . . . ). Several examples of such functionalities are described below.

The fact that the microcircuit selects and performs an action itself, depending on the identifier associated with a terminal, allows great flexibility (1) in the configuration of an electronic identity document, (2) in the addition or removal of such additional functionalities, and (3) in the activation or deactivation of additional functionalities. In fact, this provision makes it possible to ensure very extensive compatibility of such an identity document with existing networks of terminals (or inspection systems), and with the information management system on which such a set of terminals (or inspection systems) depends, and which generally comprises an infrastructure managing the distribution and verification of cryptographic keys used by said terminals (or Public Key Infrastructure (PKI)). In fact, (1) the configuration, (2) the addition or removal of additional functionalities, and (3) the activation or deactivation of additional functionalities do not entail changes to such a network of terminals (or inspection systems), or to the corresponding information system, which is extremely advantageous. Access to these functionalities therefore takes place in a transparent manner for the terminal and the corresponding information system.

A first application of a configuration or reconfiguration method according to the invention concerns automatic masking or unmasking of data contained in the microcircuit 100 of an identity document 1, depending on the terminal, in this case an inspection system, which electronically reads said identity document.

Such automatic masking of data can for example relate to data for national use such as data 124, and is performed as follows:
- when a customs inspection system of an exit border crossing point from a state issuing the identity document 1 is identified (by means of its identifier Id) by the microcircuit 100,
- or when an inspection system is identified (by means of its identifier Id) by the microcircuit 100 as being foreign to the state issuing the identity document 1,
- then the data 124 for national use are masked, that is to say still present in the microcircuit 100 but rendered inaccessible and not detectable to a system communicating with the microcircuit through its communication module 101 (for example by changing a status indicator of these data provided for that purpose).

This is physically possible by associating with the identifiers corresponding to these inspection systems, in the correspondence table T, an action Ai comprising the erasure of the data 124 for national use from the memory zone of the communication data 120.

An interface then connecting itself to the microcircuit 100 can therefore no longer access the data 124 for national use or detect their presence in the microcircuit 100 since they are then absent from the memory zones accessible to an interface or device external to the microcircuit.

Symmetrically, the data 124 for national use can be revealed in the communication data 120 (that is to say rendered accessible and possibly detectable there) when they are not already present in the latter and when a customs inspection system of an entry border crossing point into the state issuing the identity document 1 is identified by the microcircuit 100. This is physically possible by associating with the identifiers corresponding to these inspection systems, in the correspondence table T, an action Ai comprising the test of the presence and accessibility of the data 124 for national use in the communication data 120 and, if this is not already the case, revealing them among the communication data 120, so that they are subsequently delivered.

Such automatic masking and unmasking of the data 124 for national use make the identity document 1 particularly polyvalent, since it can fulfill at the same time:
- a strictly national function, by making available to entities of the state that issued it identity data of its holder P that are reserved only for national use, and
- a function of identifying its holder P at an international level in the manner of a conventional travel document.

In a second application, a method of configuring or reconfiguring an identity document according to the invention can be used advantageously to tailor the quality of biometric data contained in this document according to the terminal which has access to it.

For example, in the case where the identity document 1 is an electronic travel document, the quality of a portion (or of the totality) of the biometric data contained in the restricted access identity data 123 can be reduced as soon as a terminal, in this case an inspection system, which communicates with the microcircuit 100 of the identity document 1, is identified (by means of its identifier) by the latter as being foreign to the state that issued the travel document. Once again, this is physically possible by associating with the identifiers corresponding to these inspection systems/terminals, in the correspondence table T, an action Ai corresponding to a reduction of the quality of these biometric data.

However, when an inspection system, which communicates with the microcircuit 100 of the identity document 1, is identified (by means of its identifier) by the latter as belonging to the customs service (or to the border police) of the state that issued the travel document, the quality of the biometric data contained in the restricted access identity data 123 can be restored so as to return them to their original maximum quality.

As mentioned previously, these biometric data can for example comprise data representative of an image of the face of the holder P of the identity document, data representative of an image of one of his/her hands, one of his/her irises, of his/her venous network or else one of his/her fingerprints. The reduction of quality of one of these images can be obtained by reducing its resolution, for example by reducing the number of image elements (pixels) that comprise it. It can also be reduced by superposing it with a parasite signal, for example a random signal, or else by applying to it a transformation, able for example to be inverted by means of ancillary cryptographic data.

In practice, the quality of the biometric data contained in the restricted access identity data 123 can for example be restored from a backup copy of these biometric data, of maximum quality, present in the private data 113. Depending on the method used to reduce the quality of this image, the latter can also be restored by means of ancillary cryptographic data contained for example in the application data 112.

According to the entity on which it depends, such an inspection system can, in order to identify the holder P of an identity document, require biometric data of a greater or lesser quality. By tailoring the quality of these biometric data to the minimum required by such an inspection system, a disclosure at maximum quality of the biometric data of the holder P is advantageously avoided when this is not necessary, thus reducing the possibility of a malicious entity seizing them at maximum quality. This protects the identity of the holder and the private nature of these data, all the more as it is difficult to use or to modify a downgraded image.

Likewise, within a method of configuring or reconfiguring an identity document according to the invention, the quality of a portion of the identity data it contains in the form of texts can be tailored according to the terminal that has access to them. For example, the address of the holder can be changed depending on the terminal that has access to the microcircuit 100, so as to be present in the latter either in a downgraded form (the street number having been removed from this address, for example), or in its complete form.

A third application of a configuration or reconfiguration method according to the invention relates to the recording of statistics, relative to border crossing by an individual, in the microcircuit 100 of the identity document 1 he/she holds. This application is described below in the case of a border separating two states, and in the case where the identity document 1 is an electronic travel document.

When such an identity document 1 is presented at a terminal, for example an inspection system, the document is identified by the microcircuit 100, as explained previously. A functionality for recording border crossing statistics can therefore be obtained by associating with the identifier corresponding to a terminal of a crossing point of such a border (when producing the identity document 1), an action Ai comprising writing, in the data 130 for monitoring the use of the identity document 1, data relating to this border crossing.

The data relating to this border crossing can comprise:
 a counter value indicating the number of times the identity document 1 has been presented at a given terminal of a crossing point of said border,
 a counter value indicating the number of times the identity document 1 has been presented at any terminal that is a part of the inspection systems of the crossing points of said border, and
 the date and time of this border crossing, when these are accessible to the microcircuit 100,
 the data read and not read by the terminal, together with the functionalities used and not used.

The border crossing statistics thus recorded can then be collected by an entity of the state that issued the identity document 1, for example by its customs or border police services. In order to allow the latter to collect the data recorded in this way, it is possible to associate with the identifiers corresponding to this customs service an action Ai comprising the transmission by the microcircuit 100 of the data 130, by means of its communication module 101 and of the antenna 200.

This application for monitoring border crossings has been described above in the context of a border separating two states. It can also be implemented to establish crossing statistics of borders delimiting entities other than states, for example borders delimiting public or private bodies.

In a fourth possible application, a configuration or reconfiguration method according to the invention can also be implemented in a microcircuit 100 of an identity document 1, to enable it to respond to a read request rq received from a S.I. terminal, by transmitting to it data selected beforehand on the basis of the identifier idi that corresponds to this terminal.

Generally, when identity data contained in the microcircuit 100 are transmitted to a terminal, they can be accompanied by ancillary data allowing this terminal to authenticate their source. Such ancillary authentication data can for example be obtained by hash and signature so as to obtain a signed summary of the corresponding identity data. In this context, it is useful to be able, thanks to a method according to the invention, to select the ancillary authentication data transmitted to a given terminal from among several items of such ancillary authentication data associated with the identity data contained in the microcircuit 100.

A method according to the invention can therefore be used to implement several advantageous functionalities described above and intervening during steps L of reading or utilizing of the identity document 1.

In another application, such a method can also be advantageously implemented during steps of activating the identity document 1, performed at the time of the final issuing of this document to the holder P. FIG. 6 diagrammatically shows the main steps of an example of an activation method according to the invention.

The method can for example entail a transformation E50 of biometric data of the holder P of the identity document 1. Generally, during this transformation E50, marking data, initially combined with biometric data of the holder P in order to form a digital watermark thereon, are identified from among these biometric data and are removed so as to restore said biometric data to their original uncombined form. Such a technique of marking the biometric data in certain phases of use is described for example in patent application EP 2 280 380.

FIG. 5 diagrammatically shows an example of such a transformation E50, in the case where the biometric data of the holder P are data representative of an image of his/her face. In this example, the data representative of this image, when initially combined with marking data, take the form of an image 51 of the face of the holder P on which a text is superposed in the manner of a watermark (in this example, this is the expression "NOT VALID"). The transformation E50 identifies and removes this watermark.

Such data representative of an image of the face of the user can be present in the microcircuit 100 in a transformed form, obtained for example by Fourier transform, by wavelet transform, or by another reversible deterministic transformation of the data representative of an image of the face of the user.

The transformation E50, together with the other steps shown on FIG. 6, are performed by the microcircuit 100.

During the activation process diagrammatically shown on this figure, the identity document 1 is presented at a terminal, in this case an inspection system S.I., with which it subsequently communicates by means of its communication module 101 and the antenna 200.

As a start, the inspection system S.I. can authenticate the identity document 1, on the basis of its authentication data 121, during a step not illustrated. The microcircuit 100 then authenticates the inspection system S.I., during the step AUTEM, according to the same methods as during the authentication step AUT described previously. The microcircuit 100 also tests, during the step AUTEM, whether this inspection system is really the one tasked with activating and issuing the identity document 1, by comparing the identifier id it has transmitted with certain specific identifiers among the identifiers id1, id2 . . . idi of the correspondence table T. At the end of the step AUTEM, if the inspection system S.I. has been authenticated by the microcircuit 100, and has been identified as the inspection system tasked with activating and issuing the identity document 1, the activation process then continues with the step AUTP.

In the contrary case, the method finishes with a terminal step E61. At the end of this step E61, it is possible to envisage that the access rights initially associated with the inspection system that communicates with the microcircuit are preserved, or that they are lost. It is valuable in this situation to be able therefore to modify the access rights to this inspection system, since the identity document is then in a situation considered to be sensitive (since it has not yet been issued to its holder according to the methods envisaged during its manufacture), and since the failure of the authentication of an inspection system, which is connected to the microcircuit in this situation, can indicate a problem with issuing the identity document. At the end of the step E61, the microcircuit 100 continues to respond to requests received from outside, in accordance with the valid access rights to the terminals and inspection systems connected to it.

During the step AUTP, the microcircuit determines whether an individual "is", who presents him/herself to the inspection system S.I. and who seeks to retrieve the identity document 1, really is the holder P for whom said document is intended. For this purpose, identity data "dis" of the individual "is" can be transmitted by the inspection system S.I. to the microcircuit 100. These identity data "dis" can be compared with the identity data 120, and, optionally, with the private data 113. During this comparison, the control module 102 can in particular verify that the name, date of birth and nationality stated by the individual "is" coincide with the public identity data 122 contained in the microcircuit 100 of the identity document 1. During this comparison, the microcircuit 100 can also verify that the biometric data of the individual "is" agree with the biometric data that are part of the restricted access identity data 123 contained in the microcircuit.

At the end of the step AUTP, if the microcircuit 100 has determined that the individual "is" is the holder P for whom the identity document 1 is intended, the activation process then continues with the step TP.

In the contrary case, the method finishes with a terminal step E62 identical to the step E61.

In another embodiment, it is not the microcircuit 100 that verifies that the individual seeking to retrieve the identity document 1 really is the holder P for whom the identity document 1 is intended, but an official of the organization that issues it. For this purpose, this official compares for example identity data, extracted from the data 120 and received from the microcircuit then displayed by the inspection system, with identity data "dis" of the individual "is" who seeks the retrieval. If this official finds that these data coincide, he/she can then validate the retrieval of the identity document in a user interface of the inspection system, which can therefore transmit to the microcircuit an activation signal, which informs the latter that it can proceed to the next step TP.

During the step TP, the control module 102 determines whether the transformation E50 has already been performed by the microcircuit. If the transformation E50 has already been performed in this way, the method finishes with a terminal step E63 identical to the step E61. In the contrary case, the microcircuit 100 performs the operations ACT for activating the identity document 1, for example by applying the transformation E50 to the biometric data concerned, or by making active a "de-marking" functionality of the biometric data concerned, for example by changing the value of a variable consulted during the subsequent use of the identity document, and which is indicative of the activation of this functionality. If this variable indicates that said functionality is active, the transformation E50 is performed during subsequent connections to an inspection system or a terminal authenticated and identified by the microcircuit 100.

The control module 102 can determine whether the transformation E50 has already been performed, by reading for example a counter value, memorized in the data 130 for monitoring the use of the identity document 1, initially set to 0, and incremented each time the transformation E50 is performed by the microcircuit 100.

When the transformation E50 is not performed directly during the activation process itself, but subsequently, during connections with an inspection system or a terminal identified and possibly authenticated by the microcircuit 100, as described above, it is possible to envisage that the transformation E50 is only performed a set number of times, during said connections. In order to implement this functionality, the control module 102 can, once again, determine the number of times the transformation E50 has been performed by reading the value on the abovementioned counter.

As long as these activation steps have not been performed, a portion (or the totality) of the biometric data of the holder P of the identity document, which are data returned by the identity document 1, is therefore combined with marking data. Such marking can be used to indicate that said identity document is not valid as it stands. In this case, the identity document 1 passes from a non-valid status to a valid status during the activation steps described above.

The latter can only be performed if the identity document 1 is presented to the inspection system initially intended, on its production, to issue said identity document 1.

Likewise, they can only be performed if the identity data dis of the individual who seeks to retrieve the identity document correspond to the identity data of the holder P for whom it is intended, these data being recorded in the microcircuit 100 of the identity document 1 during its production.

This validation method therefore makes it possible to achieve secure delivery and issuing of an identity document to its holder P, since a malicious entity that might have seized the identity document 1 before it was validated would not be able to perform said validation steps.

The invention claimed is:

1. A method implemented in an identity document comprising a microcircuit and means enabling the microcircuit to communicate with a terminal, the microcircuit being configured to transmit data obtained from data stored in a storage zone in response to a request received from said terminal, the method comprising the following steps:
   the microcircuit receiving an identifier of said terminal,
   identifying said terminal, by comparing at least partially said identifier with different identifiers or portions of identifiers stored in the microcircuit,
   selecting an action on the basis of said identifier, among different actions associated respectively to said different identifiers or portions of identifiers in a memory module of the microcircuit, and
   the microcircuit performing the selected action,
   at least two of the actions, associated respectively to the different identifiers or portions of identifiers in the memory module of the microcircuit, being two transformations of different sorts of said data stored in the storage zone, the storage zone being located in one or more non-volatile rewritable memories of the microcircuit,
   wherein said action comprises a change of said data stored in the storage zone, and
   wherein said change comprises the removal or addition of marking data initially combined with biometric data of an individual.

2. The method as claimed in claim 1, further comprising a step of authentication of said terminal by the microcircuit.

3. The method as claimed in claim 1, wherein the microcircuit is designed to transmit at least one portion of said transmitted data subsequently to the step of performing said action.

4. The method as claimed in claim 1, wherein the microcircuit is designed to transmit at least one portion of said data whatever the result of the comparison step.

5. The method as claimed in claim 1, wherein the microcircuit is designed to perform said removal only if the received identifier corresponds to an identifier stored in said microcircuit and associated with a terminal therefore intended, during the production of said identity document, to issue the latter to its holder.

6. The method as claimed in claim 1, wherein said change targets an activation variable, when a received identifier corresponds to an identifier stored in said microcircuit and associated with a terminal therefore intended, during the production of said identity document, to issue the latter to its holder, and wherein the microcircuit is designed to remove or add marking data to said data obtained on the basis of said activation variable, before the transmission of data obtained from data stored in a storage zone.

7. The method as claimed in claim 1, wherein said action comprises incrementing a counter value of said microcircuit recording the number of performances by the latter of a given set action.

8. The method as claimed in claim 7, wherein said action is furthermore determined on the basis of the counter value.

9. The method as claimed in claim 8, wherein said biometric data are data representative of an image, and wherein said removal is performed by said microcircuit if the counter value indicates that said removal has not been performed by the microcircuit at any previous time.

10. The method as claimed in claim 1, wherein said action comprises a change of the level of quality of the biometric data stored in the storage zone.

11. The method as claimed in claim 1, wherein said action comprises incrementing a counter value, stored in the microcircuit and indicative of the number of identifications by the microcircuit of a given terminal.

12. The method as claimed in claim 1, wherein said action comprises selecting said transmitted identity data from among a set of identity data contained in said microcircuit, depending on the result of said comparison.

13. The method as claimed in claim 1, wherein said authentication comprises verifying, by means of a public key stored in said microcircuit, a signature of an electronic certificate received from the terminal.

14. The method as claimed in claim 13, wherein said electronic certificate comprises a data item enabling to identify a terminal or a family of terminals from among a plurality of terminals.

15. The method as claimed in claim 14, wherein a field of said electronic certificate is a "Certificate Holder Reference (CHR)" as defined in the document "BSI TR-03110 Technical Guideline Advanced Security Mechanisms for Machine Readable Travel Documents" produced by the German Federal Office for Information Security BSI ("Bundesamt für Sicherheit in der Informationstechnik"), or a truncation thereof, said "Certificate Holder Reference (CHR)" comprising the following concatenated items:
  a country code of 2 bytes conforming to standard ISO 3166-1 ALPHA-2, and
  a mnemonic code, varying in size up to 9 characters conforming to standard ISO/IEC 8859-1, and
  a sequence of 5 digital or alphanumerical characters conforming to standard ISO/IEC 8859-1.

16. The method as claimed in claim 14, wherein said item of identification data is a public key for authenticating the terminal, or a representation resulting from a deterministic transformation of said public key.

17. The method as claimed in claim 13, wherein said authentication comprises a step of verifying, by means of a public key of the terminal received from the terminal, a response to a challenge transmitted by the microcircuit, said response being signed by means of a private key of the terminal.

18. An identity document comprising:
  a microcircuit including a memory module, and
  means enabling the microcircuit to communicate with a terminal,
  the microcircuit being configured to transmit data obtained from data stored in a storage zone in response to a request received from said terminal,
  said memory module furthermore storing different identifiers or portions of identifiers, associated respectively to different actions in said memory module, and
  said microcircuit being configured to:
    receive an identifier of said terminal,
    identify said terminal, by comparing at least partially the received identifier with the different identifiers or portions of identifiers stored in said memory module,
    select an action on the basis of the identifier, among the different actions associated respectively to said different identifiers or portions of identifiers in the memory module, and
  perform the selected action,
  at least two of the actions, associated respectively to the different identifiers or portions of identifiers in the memory module, being two transformations of different sorts of said data stored in the storage zone, the storage zone being located in one or more non-volatile rewritable memories of the microcircuit,
  wherein said action comprises a change of said data stored in the storage zone, and
  wherein said change comprises the removal or addition of marking data initially combined with biometric data of an individual.

19. A method implemented in an identity document comprising a microcircuit and means enabling the microcircuit to communicate with a terminal, the microcircuit being configured to transmit data obtained from data stored in a storage zone in response to a request received from said terminal, the method comprising the following steps:
  the microcircuit receiving an identifier of said terminal,
  comparing at least partially said identifier and at least one portion of different identifiers stored in the microcircuit, and
  performing an action determined on the basis of the result of said comparison from among different actions associated respectively to said at least one portion of different identifiers in a memory module of the microcircuit,
  wherein said data stored in the storage zone comprises biometric data of an individual, and
  wherein said action comprise a change of said data stored in the storage zone, said change comprising the removal or addition of marking data initially combined with the biometric data.

* * * * *